US010800798B2

United States Patent
Fan et al.

(10) Patent No.: US 10,800,798 B2
(45) Date of Patent: Oct. 13, 2020

(54) METHOD TO SYNTHESIZE METAL HALIDE PEROVSKITE PARTICLES WITH HIGH LUMINESCENCE AND STABILITY

(71) Applicant: National Technology & Engineering Solutions of Sandia, LLC, Albuquerque, NM (US)

(72) Inventors: Hongyou Fan, Albuquerque, NM (US); Brian M. Billstrand, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/253,102

(22) Filed: Jan. 21, 2019

(65) Prior Publication Data
US 2020/0231611 A1    Jul. 23, 2020

(51) Int. Cl.
C07F 7/24    (2006.01)

(52) U.S. Cl.
CPC ..................... C07F 7/24 (2013.01)

(58) Field of Classification Search
None
See application file for complete search history.

(56) References Cited

FOREIGN PATENT DOCUMENTS

CN    107267144    * 10/2017    ........... C10G 19/006

OTHER PUBLICATIONS

CN-107267144 (2020 translation from Google Patents).*
Pazos-Outon, L. et al., "Photon Recycling in Lead Iodide Perovskite Solar Cells", Science, 2016, pp. 1430-1433, vol. 351.
Ha, S.-T. et al., "Metal Halide Perovskite Nanomaterials: Synthesis and Applications", Chemical Science, 2017, pp. 2522-2536, vol. 8.
Zhang, Y. et al., "Zero-Dimensional Cs4PbBr6 Perovskite Nanocrystals", Journal of Physical Chemistry Letters, 2017, pp. 961-965, vol. 8.
Tan, H. et al., "Efficient and Stable Solution-Processed Planar Perovskite Solar Cells via Contact Passivation", Science, 2017, pp. 722-726, vol. 355.
Wang, K-H. et al., "Large-Scale Synthesis of Highly Luminescent Perovskite-Related CsPb2Br5 Nanoplatelets and Their Fast Anion Exchange", Angew. Chem. Int. Ed., 2016, pp. 8328-8332, vol. 55.
Swarnkar, A. et al., "Quantum Dot-Induced Phase Stabilization of α-CsPbI3 Perovskite for High-Efficiency Photovoltaics", Science, 2016, pp. 92-95, vol. 354.
Tong, Y. et al., "Highly Luminescent Cesium Lead Halide Perovskite Nanocrystals with Tunable Composition and Thickness by Ultrasonication", Angew. Chem. Int. Ed., 2016, pp. 13887-13892, vol. 55.

(Continued)

*Primary Examiner* — Clinton A Brooks
(74) *Attorney, Agent, or Firm* — Kevin W. Bieg

(57) ABSTRACT

The invention provides a convenient solution-based synthesis for metal halide perovskite particles. This method requires only mild conditions and can be easily scaled up. A ligand of a proper molecule size and an optimized precursor ratio are important to obtain pure phase particles. As an example, lead bromide perovskite particles exhibited a narrow monochromatic band gap, which can be tuned by partial halide substitution, and PLQY up to 75% making this material an excellent candidate for light emission and display applications.

6 Claims, 5 Drawing Sheets

(56) References Cited

OTHER PUBLICATIONS

Liu, Z. et al., "Ligand Mediated Transformation of Cesium Lead Bromide Perovskite Nanocrystals to Lead Depleted Cs4PbBr6 Nanocrystals", Journal of the American Chemical Society, 2017, pp. 5309-5312, vol. 139.
Wei, W. and Hu, Y.H., "Catalytic Role of H2O in Degradation of Inorganic-Organic Perovskite (CH3NH3PbI3) in Air", International Journal of Energy Research, 2017, pp. 1063-1069, vol. 41.
Slavney, A. H. et al., "Chemical Approaches to Addressing the Instability and Toxicity of Lead-Halide Perovskite Absorbers" Inorganic Chemistry, 2017, pp. 46-55, vol. 56.
Bella, F. et al., "Improving Efficiency and Stability of Perovskite Solar Cells with Photocurable Fluoropolymers", Science, 2016, pp. 203-206. vol. 354.
Tsai, H. et al., "High-Efficiency Two-Dimensional Ruddlesden-Popper Perovskite Solar Cells", Nature, 2016, pp. 312-326, vol. 536.
Pazoki, M. and Edvinsson, T., "Metal Replacement in Perovskite Solar Cell Materials: Chemical Bonding Effects and Optoelectronic Properties", Sustainable Energy Fuels, 2018, pp. 1430-1445, vol. 2.
Binek, A. et al., "Stabilization of the Trigonal High-Temperature Phase of Formamidinium Lead Iodide", Journal of Physical Chemistry Letters, 2015, pp. 1249-1253, vol. 6.
Saidaminov, M.I. et al., "Pure Cs4PbBr6: Highly Luminescent Zero-Dimensional Perovskite Solids", ACS Energy Letters, 2016, pp. 840-845, vol. 1.
Chen, D. et al., "Large-Scale Room-Temperature Synthesis and Optical Properties of Perovskite-Related Cs4PbBr6 Fluorophores", Journal of Materials Chemistry C, 2016, 10646-10653, vol. 4.

\* cited by examiner

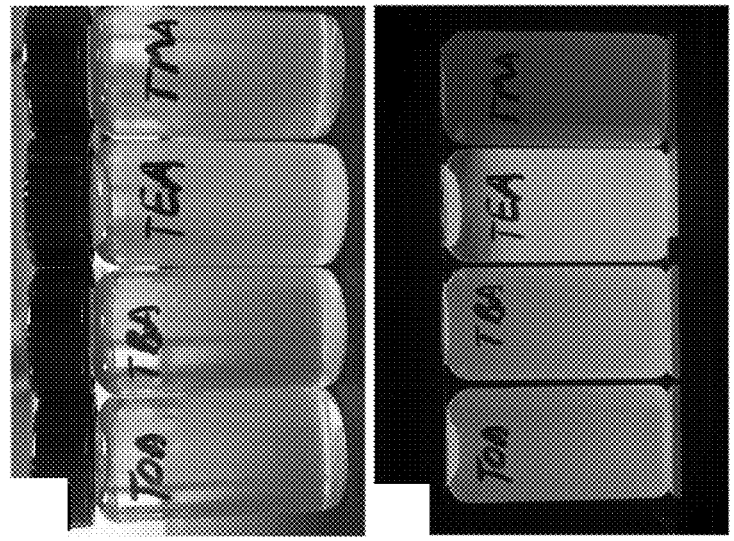
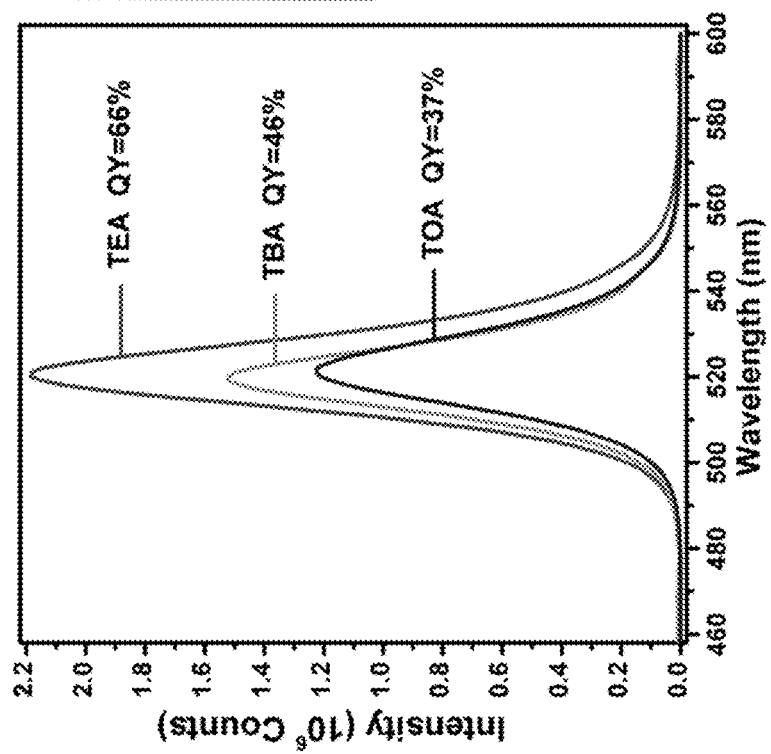
FIG. 3(a)
FIG. 3(b)
FIG. 3(c)

METHOD TO SYNTHESIZE METAL HALIDE PEROVSKITE PARTICLES WITH HIGH LUMINESCENCE AND STABILITY

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to luminescent particles and, in particular, to a method to synthesize metal halide perovskite particles with high luminescence and stability.

BACKGROUND OF THE INVENTION

Low dimensional organic and inorganic metal halide perovskite particles are of tremendous interest due to their size-tunable band gaps, low exciton binding energy, high absorption coefficients, and outstanding luminescence and photovoltaic efficiencies. See L. Pazos-Outon et al., *Science* 351, 1430 (2016); and S.-T. Ha et al., *Chem. Sci.* 8, 2522 (2017). To overcome the atmospheric vulnerability of traditional methylammonium-based devices, recent research has focused on materials utilizing a cesium cation in combination with a wide variety of long chain ammonium ligands to improve environmental stability and tune the dimension and band gap of perovskite structures. See Y. Zhang et al., *J. Phys. Chem. Lett.* 8, 961 (2017); H. Tan et al., *Science* 355, 722 (2017); K. Wang et al., *Angew. Chem. Int. Ed.* 55, 8328 (2016); W. Wei and Y. Hu, *Int. J. Energy Res* 41, 1063 (2017); and A. Slavney et al., *Inorg. Chem.* 56, 46 (2017). Perovskites produced by these methods generally have $ABX_3$, $AB_2X_5$, and $A_4BX_6$ structures in layers separated by alkylammonium ligands that interact via van der Waals forces. Here A represents an alkali metal cation such as $Cs^+$, B represents a cation such as $Pb^{2+}$ or $Sn^{2+}$, and X represents a halide such as $I^-$, $Br^-$, or $Cl^-$. These structures displayed high photoluminescence quantum yields (PLQY) of 20-90%. See A. Swarnkar et al., *Science* 354, 92 (2016); Y. Tong et al., *Angew. Chem. Int. Ed.* 55, 13887 (2016); and Z. Liu et al., *J. Am. Chem. Soc.* 139, 5309 (2017). However, most perovskite materials still suffer from very limited atmospheric stability. This instability has previously been addressed through efforts including contact passivation and polymeric coatings. See H. Tan et al., *Science* 355, 722 (2017); F. Bella et al., *Science* 354, 203 (2016); and H. Tsai et al., *Nature* 536, 312 (2016).

SUMMARY OF THE INVENTION

The present invention is directed to a new solution-based synthesis of stabilized metal halide perovskite particles with high luminescence. The method requires only mild conditions and produces colloidal particles that are ideal for highly efficient solution-based device fabrications. The synthesized microstructures not only display outstanding luminescence quantum yield but also long-term stability in atmospheric conditions. Partial halide substitutions can extend the photoluminescence spectra of the perovskite particles. This convenient synthesis and optical tunability of metal halide perovskite particles enables new applications, including optoelectronic advices.

BRIEF DESCRIPTION OF THE DRAWINGS

The detailed description will refer to the following drawings, wherein like elements are referred to by like numbers.

FIG. 1(b) illustrates the crystal structure of $Cs_4PbBr_6$. FIG. 1(c) illustrates the crystal structure of cubic $CsPbBr_3$.

FIGS. 2(b)-(e) are SEM images of perovskite particles. Scale bars are 1 μm.

FIG. 3(a) is a graph of the photoluminescence (PL) spectra and quantum yield (QY) for $Cs_4PbBr_6$ particles with TEA, TOA, and TBA ligands. FIG. 3(b) is a photograph of a $Cs_4PbBr_6$ suspension in toluene under ambient lighting. FIG. 3(c) is a photograph of a $Cs_4PbBr_6$ suspension in toluene excited by UV light at 365 nm.

DETAILED DESCRIPTION OF THE INVENTION

The present invention is directed to the synthesis of uniform metal halide perovskite particles with a variety of hydrophobic alkylammonium ligands to improve the stability of inorganic perovskite materials while simultaneously providing high quantum efficiency. In a typical synthesis, a metal halide, an alkali halide, and an alkylammonium halide surfactant are dissolved in a polar solvent. This solution is added to an equal volume of a non-polar anti-solvent while stirring or under ultrasonication, precipitating the perovskite particles. For example, the metal halide can be lead halide. However, other near-neighbor metals having similar cation charge and radius, such as tin and germanium, can also be used. Finally, other monovalent or trivalent metal cations and combinations thereof, such as copper or bismuth, that form perovskite structures can also be used. See M. Pazoki and T. Edvinsson, *Sustainable Energy Fuels* 2, 1430 (2018). For example, the polar solvent can be dimethylformamide or tetrahydrofuran. For example, the non-polar anti-solvent can be toluene or hexane.

The solution-based synthesis of cesium lead bromide particles is described as an example of the invention. Compared with previously reported hot injection methods which require high temperature, vacuum, inert environment and high-boiling point solvents, this inexpensive synthesis can be carried out under mild conditions: room temperature, ambient air and with easy-to-remove solvents. See Y. Zhang et al., *J. Phys. Chem. Lett.* 8, 961 (2017); Z. Liu et al., *J. Am. Chem. Soc.* 139, 5309 (2017); M. Saidaminov et al., *ACS Energy Lett.* 1, 840 (2016); D. Chen et al., *J. Mater. Chem. C* 4, 10646 (2016); L. Protesescu et al., *Nano Lett.* 15, 3692 (2015); J. Sichert et al., *Nano Lett.* 15, 6521 (2015); and K. Wang et al., *Angew. Chem. Int. Ed.* 55, 8328 (2016). The product particles display high quantum yield and enhanced stability. In addition, they form homogenous colloidal suspensions in common solvents, desirable for highly efficient solution-based processing and device fabrications.

In an exemplary synthesis, 0.1 mmol of tetraethylammonium bromide (TEABr), tetrabutylammonium bromide (TBABr), or tetraoctylammonium bromide (TOABr) were mixed with 5 mL of dimethylformamide (DMF). Next, lead bromide ($PbBr_2$) and cesium bromide (CsBr) were dissolved consecutively in the DMF solvent using a 1:2:1, 2:2:1, or 3:2:1 ($PbBr_2$:TEABr/TBABr/TOABr:CsBr) molar ratio. This solution was added to an equal volume of toluene while stirring or under ultrasonication. Precipitation of the perovskite particles completed in 4 hrs. The final yellow suspension was then cleaned by centrifugation and re-dispersed in toluene for characterization. The hygroscopic tetraammonium precursors need to be completely free of humidity since hydrated precursors will significantly reduce PLQY of the final perovskite products. Anhydrous solvents and a dry environment are also desired.

Figure 1A:
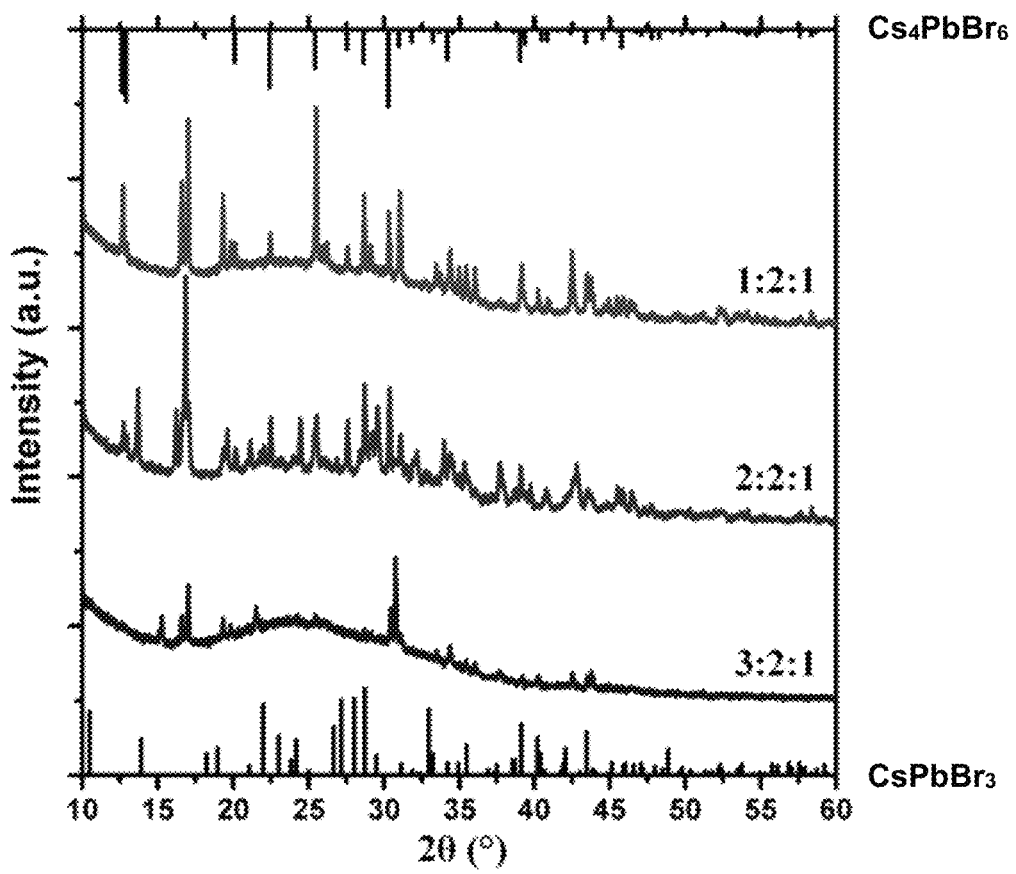
FIG. 1(a) is a graph of powder X-ray diffraction (XRD) patterns of TEA-confined materials with different precursor ratios (Pb:TEA:Cs). The theoretical XRD patterns for $Cs_4PbBr_6$ and $CsPbBr_3$ structures are marked on top and bottom of the graph, respectively, for reference.
Figure 1A:
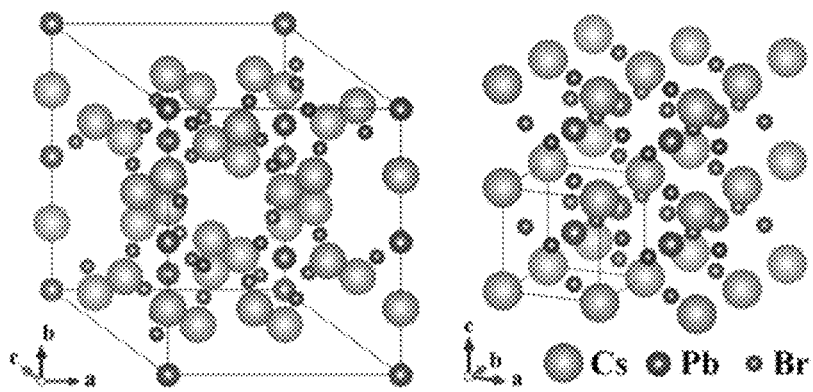

Based upon these stoichiometric ratios, either $CsPbBr_3$ or $CsPb_2Br_5$ perovskite structures were obtained. See Y. Tong et al., *Angew. Chem. Int. Ed.* 55, 13887 (2016). FIGS. 1(*a*)-(*c*) provide a structural analysis of the product perovskites obtained with different precursor ratios. As revealed by the XRD patterns in FIG. 1(*a*), the 3:2:1 precursor ratio yielded $CsPbBr_3$ perovskite. The structure of the $CsPbBr_3$ perovskite is shown in FIG. 1(*c*). However, the 1:2:1 ratio yielded a pure $Cs_4PbBr_6$ phase, as shown in FIG. 1(*b*), while the 2:2:1 precursor ratio showed a transition or mixture state. The $Cs_4PbBr_6$ crystal was indexed to have a rhombohedral lattice (space group R-3c) with parameters of a=b=13.72 Å and c=17.30 Å. This phase is believed to result from the formation of templated lead bromide ligand complexes before the incorporation of cesium into the structures, similar to the strategy of utilizing lead iodide templating organic cations to achieve pure perovskite materials. See A. Binek et al., *J. Phys. Chem. Lett.* 6, 1249 (2015). This interpretation is supported by the increased intensity and blue shift from 610 nm to 560 nm of the PL peak observed in the $PbBr_2$-TEABr precursor solution in DMF comparing with $PbBr_2$-only solution. The $Cs_4PbBr_6$ phase is desirable for LED applications due to its larger exciton binding energy of 353 meV compared to only 19-62 meV for $CsPbBr_3$, as the larger binding energy prevents exciton dissociation into free carriers and increases luminescence efficiency. See M. Saidaminov et al., *ACS Energy Lett.* 1, 840 (2016); and J. Xing et al., *ACS Nano* 10, 6623 (2016). Therefore, all of the syntheses described below used a 1:2:1 precursor ratio to produce $Cs_4PbBr_6$ perovskite.

Figure 2A:
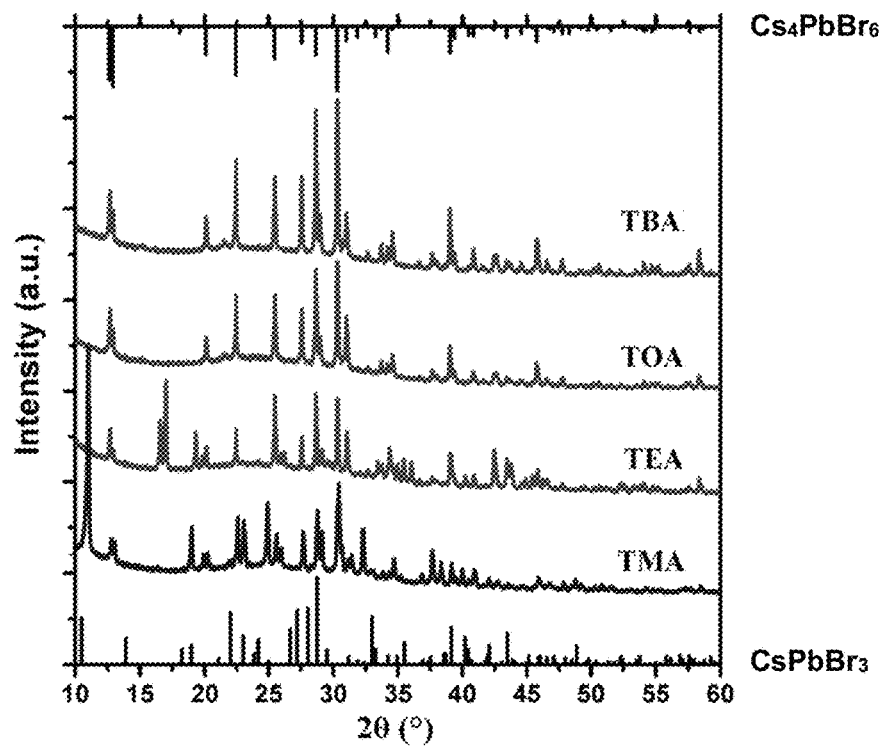
FIG. 2(a) is a graph of the powder X-ray diffraction data for the samples. Calculated XRD patterns for $Cs_4PbBr_6$ and $CsPbBr_3$ structures are shown on the top and bottom of the graph, respectively.
Figure 2A:
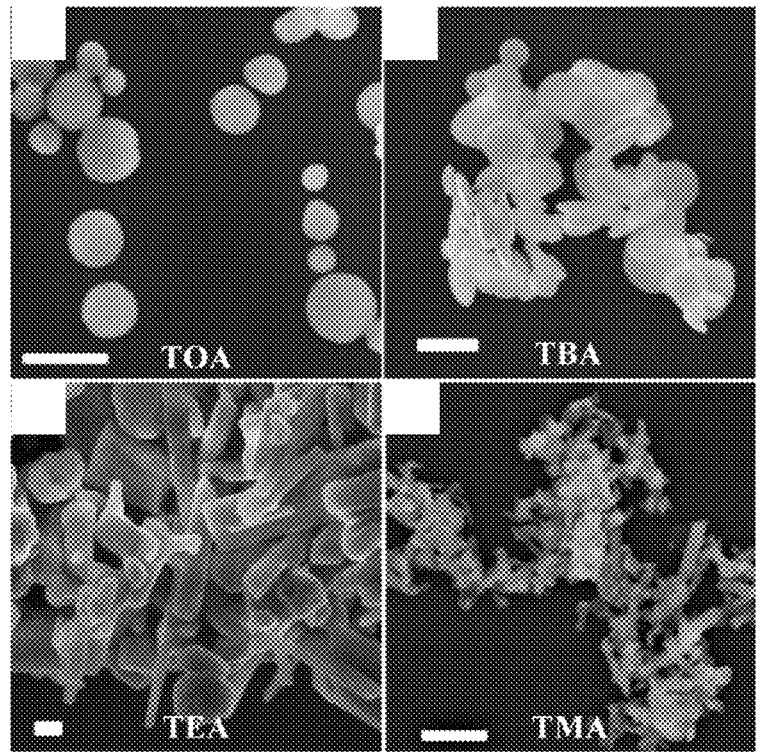

To explore the ligand effect on the optical performance and stability of the perovskite particles, ligands of various alkyl chain lengths were explored, including tetraoctylammonium (TOA), tetrabutylammonium (TBA), tetraethylammonium (TEA), and tetramethylammonium (TMA). FIGS. 2(*a*)-(*e*) compare the crystal structure and morphology of perovskite particles synthesized with different ligand types. As measured by XRD in FIG. 2(*a*), all of the syntheses except the TMA-functionalized particles showed a rhombohedral R-3c crystal structure of $Cs_4PbBr_6$. It is also important to note the change in particle morphology. Crystal growth with the TEA ligand resulted in rod-like structures of up to 10 μm in size, as shown in FIG. 2(*d*), much larger compared to the platelet structures with diameters from 300-750 nm obtained with other ligands, shown in FIGS. 2(*b*)-(*c*) and (*e*). The XRD patterns of the TEA particles show a strong (202) peak (2θ=17°) indicating preferential growth in this direction and agreeing with the faceted particles. In contrast, the TOA and TBA samples lack a noticeable (202) peak, consistent with the platelet particle shape. The formation of the platelet structures could be a result of crystallization hindered by the bulkier ligand molecules. The large particle size of TEA-$Cs_4PbBr_6$ could significantly improve charge transport within optoelectronic devices.

FIG. 3(*a*) shows the photoluminescence spectra of perovskite particles functionalized by different ligands. All of the perovskite particles exhibited sharp fluorescence peak around 520 nm with narrow width (FWHM=9 nm). Such emission matches perfectly with the standard green according to the National Television System Committee (NTSC) making this material an excellent candidate for display applications. The highest PLQY of 66% was achieved from TEA-passivated particles. This is a 15-20% improvement in PLQY compared to perovskite particle suspensions reported previously. See M. Saidaminov et al., *ACS Energy Lett.* 1, 840 (2016); and D. Chen et al., *J. Mater. Chem. C* 4, 10646 (2016). It is also competitive with thin films of $Cs_4PbBr_6$ nanocrystals, which were reported to show PLQY up to 54%. See Y. Zhang et al., *J. Phys. Chem. Lett.* 8, 961 (2017). The structures synthesized by the TOA and TBA ligands exhibit lower quantum yield compared to the TEA structures. This is possibly the result of incomplete ligand coverage caused by steric repulsion between the bulky tetraalkylamine ligand molecules. It is also noticed that replacing stirring with sonication further increases the PLQY by at least 15% for all ligands used due to better mixing with the best record of 75% from the TEA-passivated particles with sonication.

Figure 4:
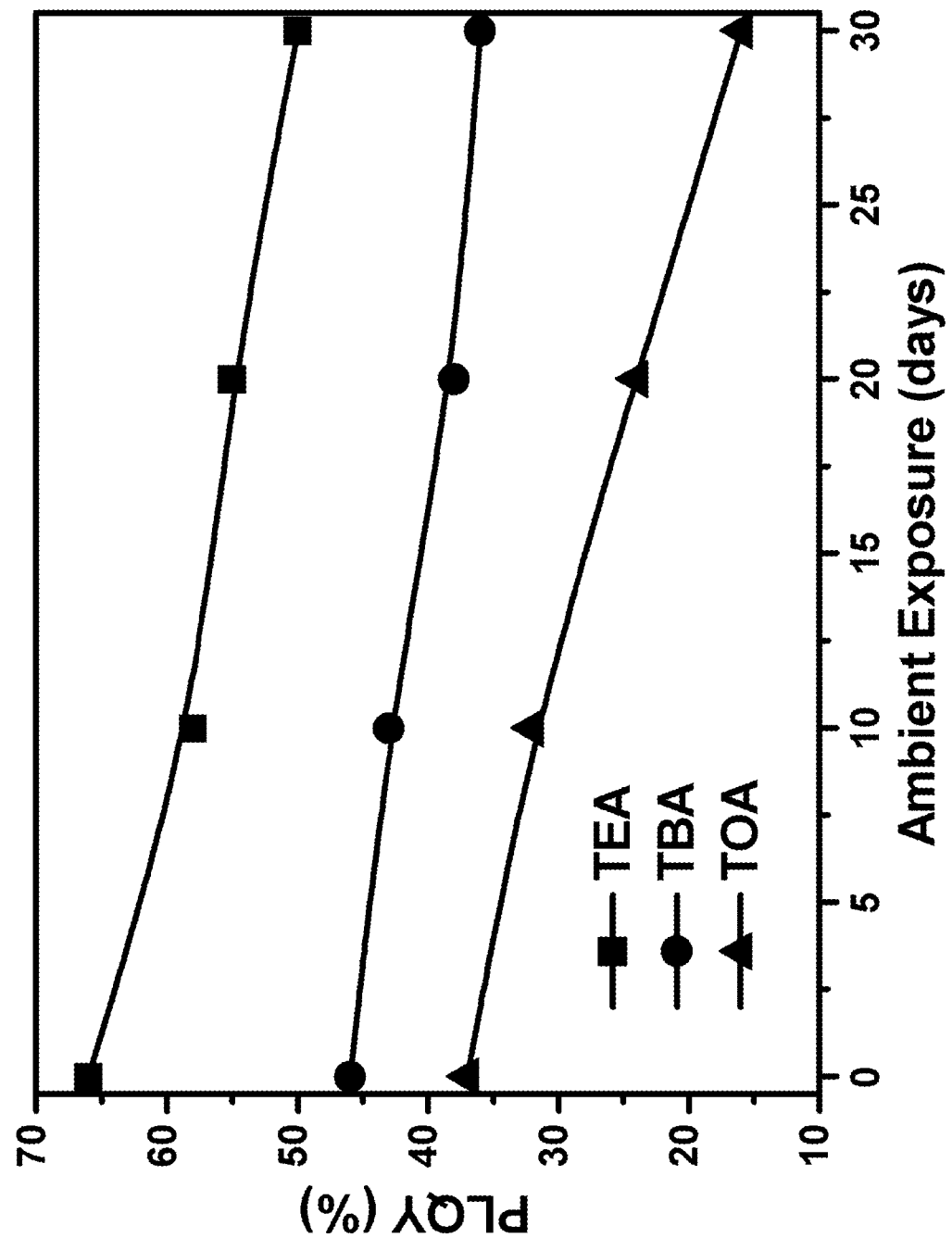
FIG. 4 is a graph showing the degradation of the photoluminescence of perovskite particles passivated by different ligands when exposed to atmosphere for up to 30 days.

To determine their ambient stability, the perovskite particles were deposited on glass slides and left in atmosphere for 30 days. During this period the samples' PLQY were measured every 10 days. As shown in FIG. 4, the stability of the synthesized perovskite particles improves with decreasing ligand length. A 24%, 21% and 45% reduction from the original PLQY for TEA, TBA and TOA ligands was observed over 30 days, respectively. In contrast, bulk $Cs_4PbBr_6$ perovskite was reported to lose 65% of the original quantum yield upon ambient aging for 30 days. See D. Chen et al., *J. Mater. Chem. C* 4, 10646 (2016). The enhanced stability of the perovskite particles is believed to result from moisture isolation by the hydrophobic alkyl chains on the ligands. The faster degradation of TOA-passivated particles is likely due to incomplete ligand coverage and partial conversion to $CsPbBr_3$ due to exposure to atmosphere, which has been previously shown to greatly reduce quantum yield. See M. Saidaminov et al., *ACS Energy Lett.* 1, 840 (2016).

Figure 5A:
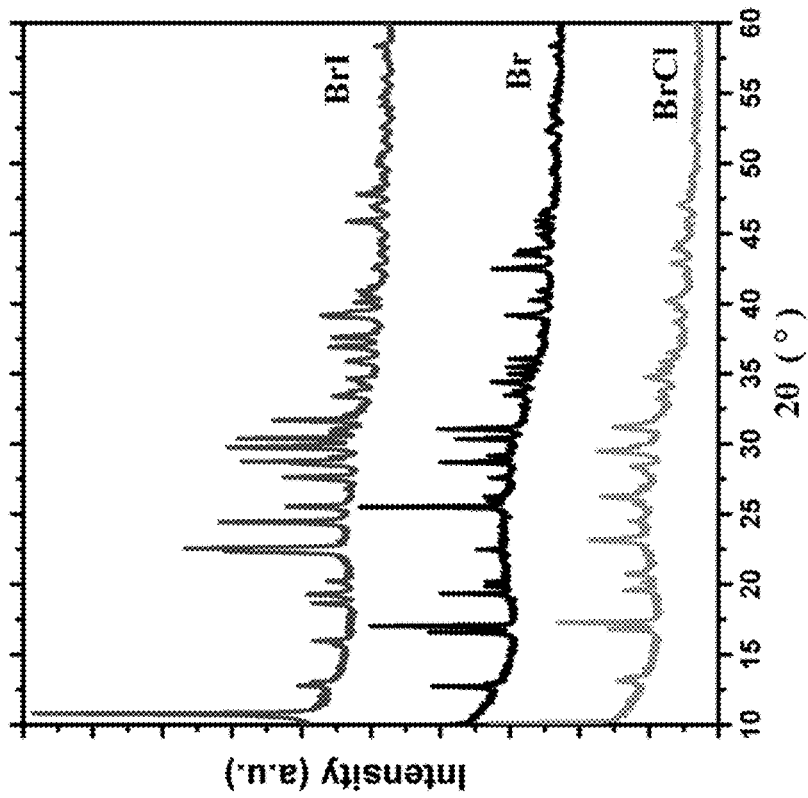
FIG. 5(a) is a graph of PL spectra and quantum yield for iodide- and chloride-substituted particles. Inset shows toluene suspension of perovskite particles excited by UV light.
Figure 5B:
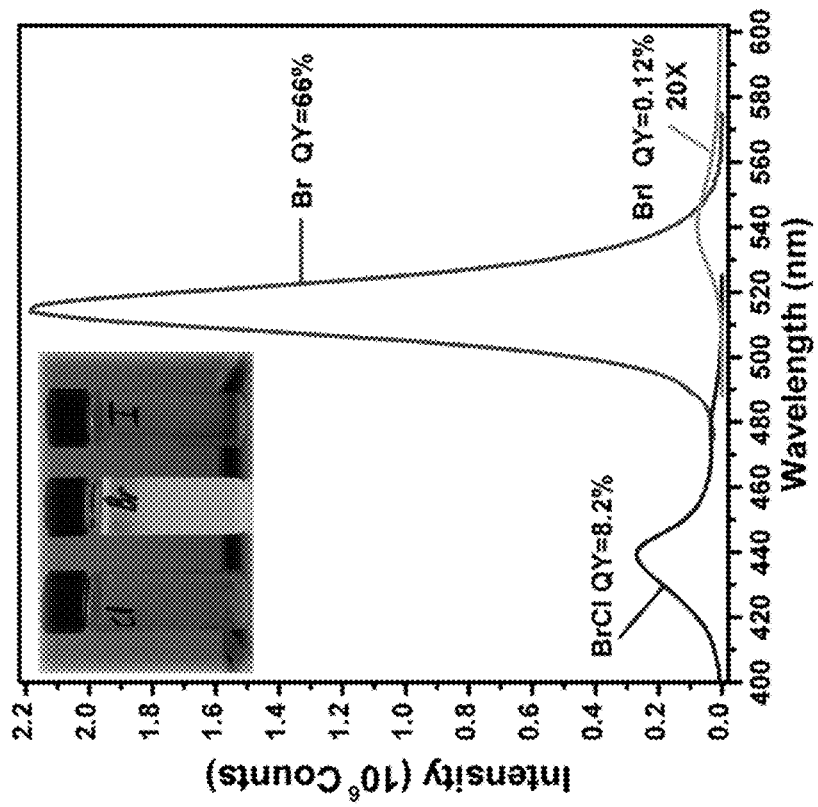
FIG. 5(b) is a graph of XRD patterns of the same samples in FIG. 5(a).

To tune the band gap of the perovskite particles, particle halide substitutions were performed to produce hybrid perovskite particles by replacing TEA bromide precursor by TEA chloride or TEA iodide. A larger halide anion was expected to result in larger band gaps and thus a red-shifted PL peak. See H. Takaba et al., *Chem. Phys.* 485-486, 22 (2017); and E. M. Talbert et al., *Nanoscale* 9, 11833 (2017). FIGS. 5(*a*) and 5(*b*) illustrate the effects of partial halide substitution of perovskite particles. As shown in FIG. 5(*a*), the emission peak in the PL spectra shifts from 520 nm for the Br-only particle to 440 nm and 541 nm for the Br—Cl and Br—I hybrid structures respectively. XRD analysis indicates a successful halide substitution, as indicated by the pronounced peak shifts in FIG. 5(*b*). The iodide pattern contained unidentifiable peaks leading to the conclusion that there are additional phases and or impurities in the sample. Unfortunately, the hybrid structures showed only a fraction of QY of the Br-only material, possibly caused by impurities. A pure iodide product may improve luminescence efficiency.

The present invention has been described as a method to synthesize metal halide perovskite particles with high luminescence and stability. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize metal halide perovskite particles, comprising:
   providing a solution comprising lead bromide, a tetraalkylammonium bromide surfactant, wherein alkyl is an ethyl or higher group, and cesium bromide in a polar solvent, and
   mixing a non-polar anti-solvent with the solution to precipitate $Cs_4PbBr_6$ perovskite particles.

2. The method of claim 1, wherein the tetraalkylammonium bromide surfactant comprises tetraethylammonium bromide, tetrabutylammonium bromide, or tetraoctylammonium bromide.

3. The method of claim 1, wherein the polar solvent comprises dimethylformamide or tetrahydrofuran.

4. The method of claim 1, wherein the non-polar anti-solvent comprises toluene or hexane.

5. The method of claim 1, wherein the mixing comprises stirring.

6. The method of claim 1, wherein the mixing comprises sonicating.

* * * * *